Jan. 4, 1949.   I. A. PAIGE   2,458,409
OUTLET BOX CONNECTOR
Filed Feb. 17, 1947
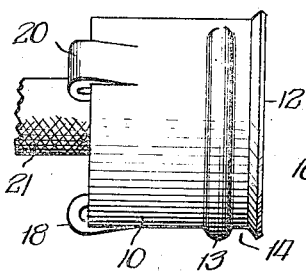
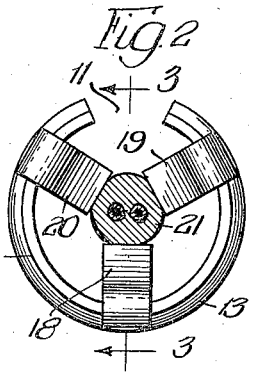
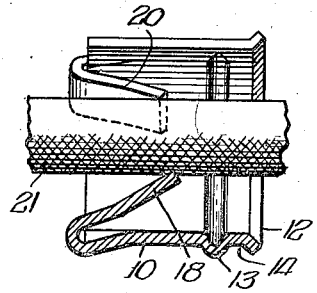
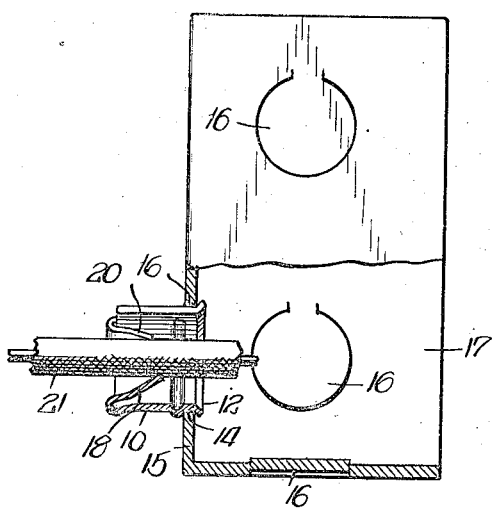
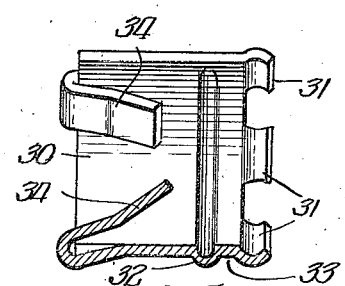
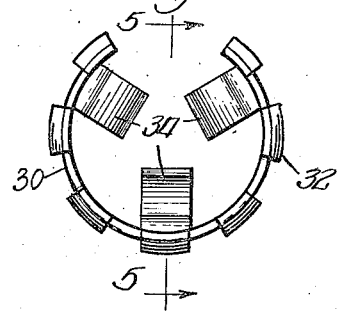
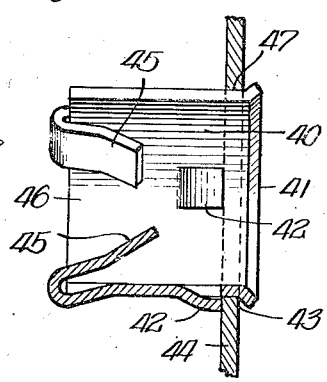
INVENTOR.
Isaac A. Paige,
BY
Cromwell, Greist & Warden
Attys.

Patented Jan. 4, 1949

2,458,409

UNITED STATES PATENT OFFICE 2,458,409

OUTLET BOX CONNECTOR

Isaac A. Paige, Chicago, Ill., assignor to Paige Electrical Products Corp., Chicago, Ill., a corporation of Illinois Application February 17, 1947, Serial No. 729,090

6 Claims. (Cl. 285—6.5)

This invention relates to improvements in a connector for use in securing an electrical conduit or cable in the knockout hole in an electrical outlet box.

An object of the invention is to provide a simple one-piece connector member, for securing an electrical conduit in a knockout hole of an electric outlet box which member is so constructed that the electrician or other user may quickly and easily secure the connector to the cable and to the outlet box.

Another object of the invention is to provide an improved outlet box connector which is constructed of resilient material and is provided with portions which are adapted to be radially contracted to permit insertion in the outlet box and to retain the connector therein and which is provided with other portions adapted to engage the conduit or cable to resiliently retain the latter in position in the connector.

A more specific object of the invention is to provide an improved connector, for the purpose described, which comprises an integral one-piece tube-like spring metal member adapted to be readily contracted for insertion in the knockout hole and having radially inwardly directed spring fingers for engagement with a cable passed therethrough.

These and other objects and advantages will be apparent from a description of the preferred forms of the invention which are shown by way of illustration in the accompanying drawings, wherein:

Fig. 1 is a side elevation of a connector embodying the principles of the invention;

Fig. 2 is an end elevation of the connector;

Fig. 3 is a section, taken on the line 3—3 of Fig. 2;

Fig. 4 is a view, partially in section, showing the connector installed in the knockout hole of an outlet box and securing an electrical conduit therein;

Fig. 5 is a longitudinal section, taken on the line 5—5 of Fig. 6, showing a modified form of connector;

Fig. 6 is an end elevation of a modified form of connector; and

Fig. 7 is a longitudinal section similar to Fig. 3, showing a further modified form of connector.

The preferred form of the connector, as illustrated in Figs. 1 to 4 of the drawings comprises a tubular section 10 constructed of spring material such as, for example, spring steel. The tubular section 10 is provided with a slot 11 extending the full length of the section which is of sufficient width to permit substantial contraction of the section by gripping or squeezing the section between the jaws of a pair of pliers or the like.

The forward edge of the section 10 is bent outwardly to provide an end abutment flange or shoulder 12. A cricumferential shoulder or rib 13 is formed inwardly from the flange 12. The rib 13 and the flange 12 form between them a groove 14 for receiving the edge of the wall 15 (Fig. 4) around the knockout hole 16 when the connector is installed in a conventional outlet box 17.

Spring finger or tongue members 18, 19 and 20 are provided at the other end of the connector, preferably by cutting away portions of the material and leaving axially extending strip portions or extensions which are then reversely bent inwardly into the general position shown in Figs. 2 to 4. The spring fingers 18, 19 and 20 extend radially inwardly and in a generally forward direction along the axis of the connector forming with the adjacent wall a generally U-shaped cross section.

When the cable 21 is inserted in the connector 10, the end of the cable 21 is passed through the connector from the left (Figs. 1 to 4) so that fingers 18, 19 and 20 engage the surface of the cable and securely hold it against withdrawal axially from the connector.

The fingers 18, 19 and 20 are preferably of different lengths so that the engaging end of each finger will be in a different transverse plane relative to the cable. This arrangement insures a better grip on the cable. With this construction when a pull is exerted on the cable, the tendency is to draw the spring fingers radially inwardly and thus increase the gripping force exerted by them on the cable.

A modified form of connector is illustrated in Figs. 5 and 6. This form of connector comprises a tube-like section 30 having a plurality of peripherally spaced finger-like curved extensions 31 at one end. An annular abutment shoulder 32 is provided at a spaced distance adjacent the fingers 31 forming therebetween a groove 33 for reception of the outlet box wall. Fingers 34 which are shown extending radially inwardly of the other end of the section 30 are the same construction as fingers 18, 19 and 20 of the preferred form. This form of connector may be installed in the outlet box by applying axial pressure sufficient to cause the fingers 31 to contract and snap over the edges of the outlet box wall which forms the periphery of the knockout hole.

Another modified form of connector is illustrated in Fig. 7. In this form of connector the tubular section 40 is provided with a turned over edge forming an end abutment flange 41. Resilient tongues 42 are provided inwardly spaced therefrom and form therebetween a space 43 for reception of the outlet box wall 44. The connector is provided with cable or conduit engaging resilient spring fingers 45 which are formed as in the preferred form. This form of the connector may be inserted from the inside of the box by merely forcing it with the end 46 foremost, through the knockout hole 47 until the tongues 42 snap past the edges of the wall 44. The cable may then be inserted by forcing the end thereof past the fingers 45.

While I have referred to specific materials and details of construction in describing the illustrated forms of the invention, it will be understood that other materials and other details of construction may be resorted to within the spirit of my invention.

I claim:

1. A connector member for securing the end of an electrical conduit to an outlet box, comprising a one-piece tube-like member of spring material, said member being longitudinally slotted throughout its length whereby it is radially contractible for insertion of one end in a knockout hole in the wall of an outlet box, cooperating spaced abutment shoulders adjacent one end of said member forming a groove on said member for preventing axial movement of said member after it is inserted in said knockout hole and permitted to expand into engagement with the outlet box wall, and integral spring fingers extending on the other end of said member in a radially and axially inward direction within said member for engagement with the electrical conduit to retain the same in position in said connector.

2. A connector for securing an electrical conduit in a hole in an outlet box, comprising a one-piece hollow tube-like section of thin resilient sheet metal, said section being provided with a slot extending longitudinally throughout the length of the section, the edges of the section which define the slot being substantially spaced apart to render the section resiliently contractible for insertion and expansion in the hole, said section having formed integrally with one end thereof a reversely bent tongue of substantial length which extends radially and axially within the body of said section for resiliently clamping a conduit within the section and permitting ready insertion of the conduit from one end of the section into clamped engagement with said tongue, and said section also having formed integrally therewith longitudinally spaced outwardly directed abutments adjacent the other end thereof for engagement with opposite sides of the wall of the outlet box to prevent endwise movement of the section subsequent to its insertion and expansion in the hole.

3. A connector for securing an electrical conduit in a hole in an outlet box, comprising a one-piece hollow tube-like section of thin resilient sheet metal, said section being provided with a slot extending longitudinally throughout the length of the section with the edges of the section which define the slot being substantially spaced apart to render the section resilient contractible for insertion and expansion in the hole, said section having an integral finger forming extension at one end thereof adjacent one of said slot defining edges, said extension projecting within said section and forming with the adjacent wall a generally U-shaped cross section whereby to resiliently clamp a conduit inserted therein against the opposite wall of said section and permitting ready insertion of the conduit from said end of the section into clamped engagement with said extension, and said section also having formed integrally with the other end thereof longitudinally spaced outwardly directed abutments for engagement with opposite sides of the wall of the outlet box to prevent endwise movement of the section subsequent to its insertion and expansion in the hole.

4. A connector for securing an electrical conduit in a knockout hole in an outlet box comprising a one-piece tube-like section having an axial inwardly extending slot at one end to provide resilient portions adapted to be radially contracted to reduce the circumference of the section for insertion in the knockout hole, a peripheral abutment spaced from said portions and cooperating with said portions to engage the wall of the outlet box and prevent axial movement of the connector relative to said outlet box, said section having a resiliently bent integral tongue extending from the other end thereof which projects axially inwardly into the section for engaging and securing a cable therein.

5. A connector as claimed in claim 4 wherein said reversely bent tongues are of different lengths and engage the conduit at spaced points axially of the same.

6. A connector as claimed in claim 4 wherein said resilient portions comprise curved resilient integral tongues extending from the end of said section.

ISAAC A. PAIGE.

REFERENCES CITED

The following references are of record in the file of this patent:

UNITED STATES PATENTS

| Number | Name | Date |
|---|---|---|
| 1,106,761 | Weikert | Aug. 11, 1914 |
| 1,204,625 | Wheelock | Nov. 14, 1916 |
| 1,236,027 | Wheelock | Aug. 7, 1917 |
| 1,830,250 | Tiefenbacher | Nov. 3, 1931 |
| 1,882,021 | Lauer | Oct. 11, 1932 |
| 1,987,035 | Tideman | June 8, 1935 |
| 2,160,353 | Conners | May 30, 1939 |